H. E. KEYES.
WHEEL.
APPLICATION FILED MAR. 13, 1909.

921,613.

Patented May 11, 1909.
2 SHEETS—SHEET 1.

Witnesses
James F. Crown
M. L. Skinner

Inventor
Henry E. Keyes
By Watson E. Coleman
Attorney

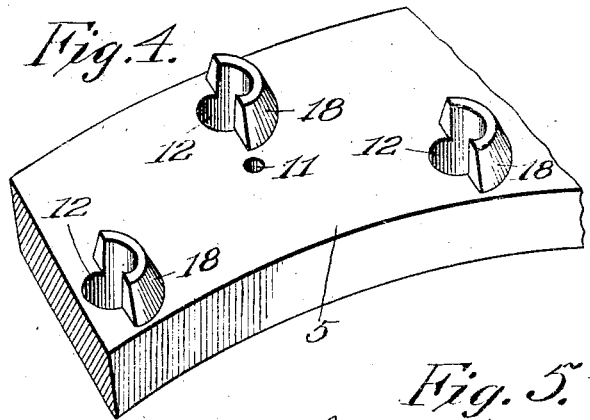
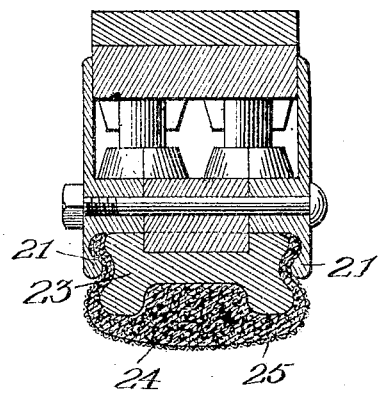
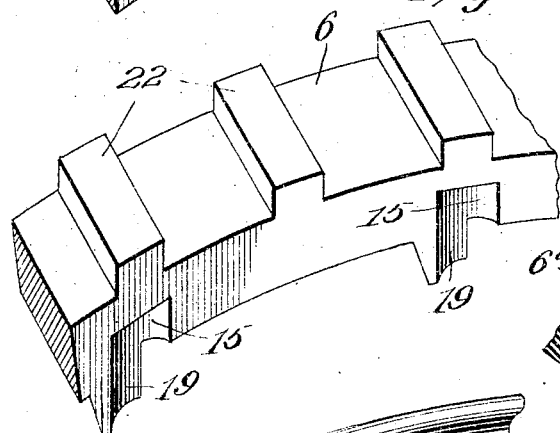
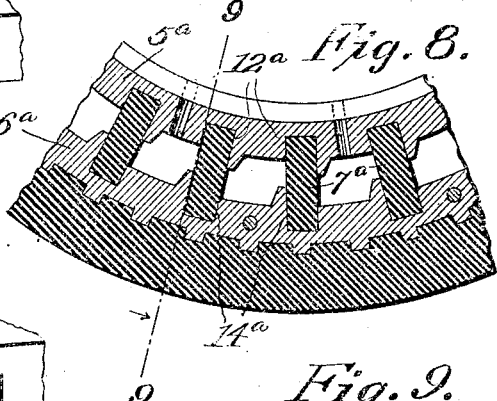
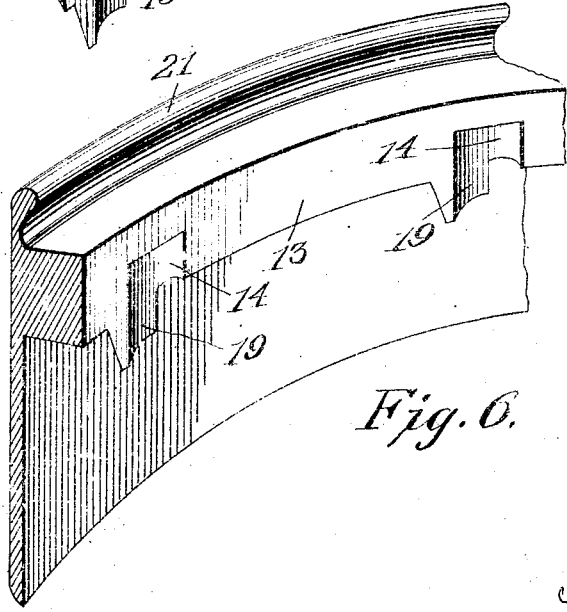
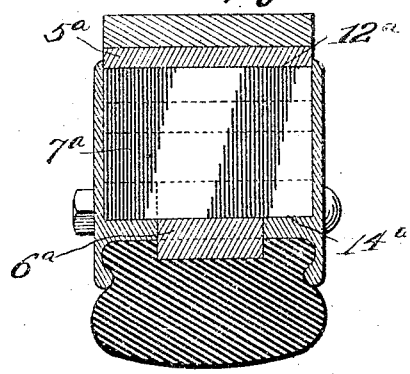

UNITED STATES PATENT OFFICE.

HENRY E. KEYES, OF HOMESTEAD, PENNSYLVANIA, ASSIGNOR TO THE TRIUMPH AUTOMOBILE TIRE COMPANY, OF WHEELING, WEST VIRGINIA, A CORPORATION OF WEST VIRGINIA.

WHEEL.

No. 921,613.  Specification of Letters Patent.  Patented May 11, 1909.

Application filed March 13, 1908. Serial No. 420,907.

*To all whom it may concern:*

Be it known that I, HENRY E. KEYES, a citizen of the United States, residing at Homestead, in the county of Allegheny and State of Pennsylvania, have invented certain new and useful Improvements in Wheels, of which the following a specification, reference being had to the accompanying drawings.

My invention relates to improvements in resilient wheels and tires for heavy automobiles, machinery and vehicles, and consists of the novel features of construction and the combination and arrangement of devices hereinafter fully described and claimed.

The object of the invention is to improve and simplify the construction and operation of wheels of this character and to provide one which will be simple, strong, durable and highly effective in accomplishing its intended purposes.

The above and other objects of the invention, as will hereinafter appear, are attained in the preferred embodiments illustrated in the accompanying drawings, in which—

Figure 1:
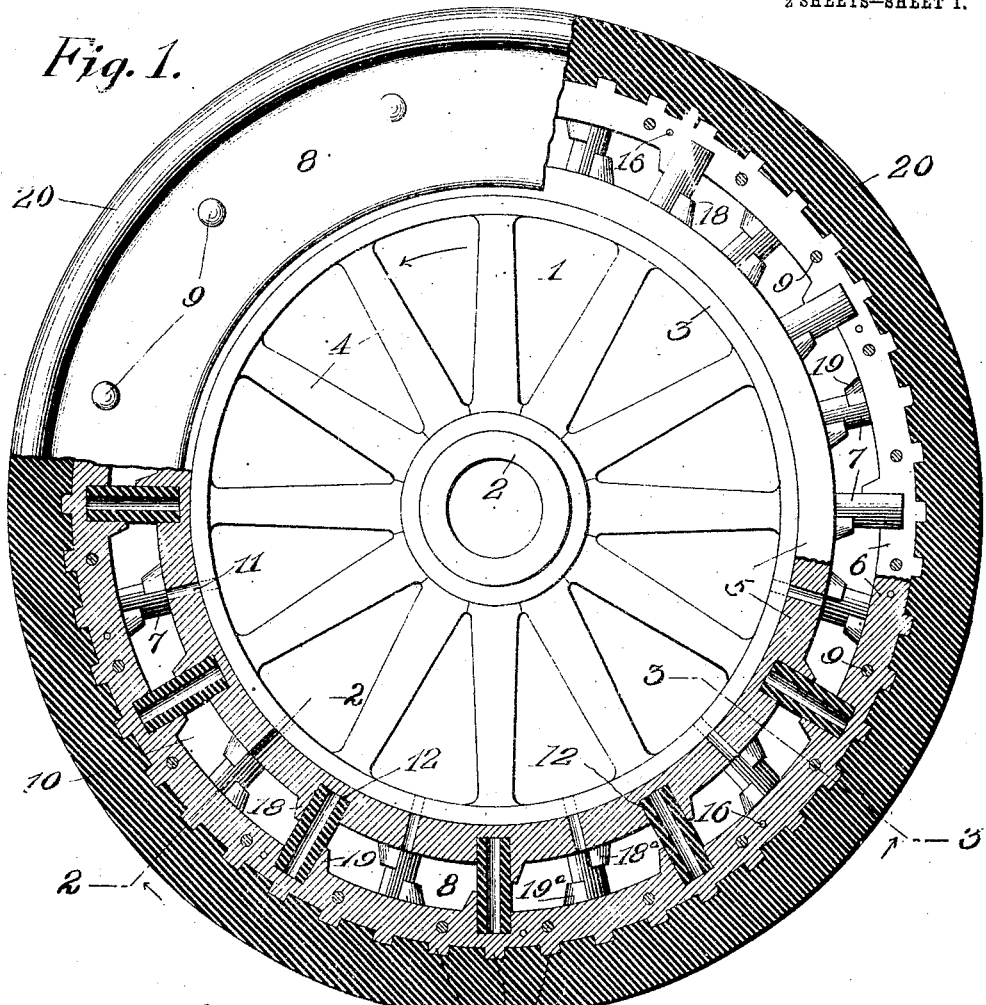
Figure 2:
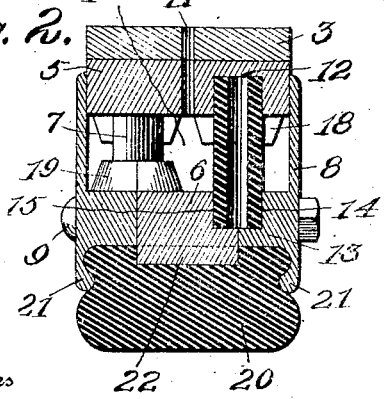
Figure 3:
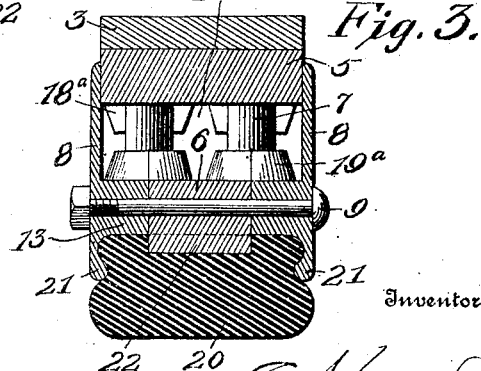

Figure 1 is a view of my improved wheel, showing part of it in side elevation, part with a portion of one of the side plates removed and part in longitudinal section; Figs. 2 and 3 are transverse sectional views taken, respectively, on the planes indicated by the lines 2—2 and 3—3 in Fig. 1; Figs. 4, 5 and 6 are detail sectional perspectives of the inner and outer rim sections and one of the side plates, respectively; Fig. 7 is a detail transverse section through a portion of the rim of the wheel, showing a different form of tread; Fig. 8 is a detail longitudinal section through a portion of a modified form of the invention; and Fig. 9 is a transverse section taken on the plane indicated by the line 9—9 in Fig. 8.

My invention comprises a resilient or cushioned tire which may be constructed so as to form an integral part of a wheel body of any suitable form and construction, or it may be constructed, as shown in Fig. 1, separate from the body of the wheel 1 and suitably secured thereto. This wheel body may be of any desired form and construction, but as illustrated, it has a hub 2 and a rim or felly portion 3 united by spokes 4.

The improved tire comprises inner and outer annular rim sections 5, 6, interposed cushioning members 7 and side plates 8. The cushioning members 7 are arranged radially at suitable intervals between the rim sections so as to space them apart and resiliently or elastically support the outer rim section from the inner one, which latter is suitably secured upon the felly 3 of the wheel 1, or, as above stated, I may form the rim or felly portion of a wheel body of any other form and construction than the one illustrated. The side plates 8 are secured upon the opposite sides of the outer rim section 6 by bolts or other transverse fastenings 9 and slidably engage the outer faces of the inner rim section 5 so as to guide the outer one in its radial movement and to inclose the space between the rim sections and form an annular air chamber 10. Alined radial openings 11 are formed at suitable intervals in the rim section 5 and the felly 3 to permit air to circulate in said chamber 10.

The cushioning members 7 are preferably in the form of short sections of rubber hose but they may be either solid or tubular and of circular, square, octagonal, or other polygonal shape in cross section. They may be of rubber or any other suitable elastic or resilient material, but by making them of rubber or the like the two rim sections will be permitted to move radially toward and from each other and also laterally or longitudinally with respect to each other. One or more annular rows of said cushioning members may be provided but I preferably employ two of such rows and arrange the members of the different rows in staggered relation, as illustrated in the drawings. It will be understood, however, that the members may be otherwise arranged than as illustrated.

The cushioning members 7 are retained in position between the rim sections by inserting their inner ends in radially disposed sockets 12 formed in the inner rim section 5 and by arranging their outer ends in similar sockets formed between the outer rim section and the two side plates 8. It will be noted upon reference to Figs. 2 and 3 that the outer rim section 6 is of less width than the inner rim section 5 and its opposite sides are engaged by annular inwardly extending ribs or enlargements 13 formed upon the inner face of the side plates 8; and that in the opposing faces of the rim section 6 and the ribs 13 are formed opposing recesses or seats 14, 15, respectively, which recesses register with each other and provide the sockets for the outer ends of the members 7. By constructing the outer rim section and the side plates in this manner and providing in them the socket recesses 14, 15 it will be seen that the tire may be readily taken apart and that the cushioning members may be easily placed in and removed from their sockets. The bolts 9 pass through alined apertures in the rim section 6 and the ribs or flanges 13 on the side plates to detachably unite said parts; but to more rigidly and effectively unite them and relieve the bolts or fastenings 9 of strain, I may form upon the side faces of the rim section 6 pins or studs 16 to enter sockets or recesses in the ribs 13.

For the purpose of strengthening and reinforcing the cushioning members 7, I form on the opposing faces of the outer and inner rim sections brace lugs or projections 18, 19. These brace lugs are formed at the sockets which receive the ends of the cushioning members and they are recessed so as to extend a little less than half way around said members 7. The majority of the brace lugs 18 upon the inner rim section (or if desired all of said lugs) are disposed on one side of the member 7, which side is the one to the rear of the direction in which the wheel rim moves, while the majority of the brace lugs on the outer rim section (or if desired all of said lugs 19) are disposed on that side of the member 7 which is to the front of the direction in which the wheel rim moves, as clearly shown in Fig. 1, in which the arrow indicates the direction of rotation of the wheel. It will be seen, therefore, that the lugs 18, 19 which engage the same cushioning member are disposed on opposite sides of said member so that as the wheel turns the member will be reinforced and braced by said lugs. In order to prevent the tire from collapsing and to assist in restoring the members 7 to their radial position when the wheel is not under great strain, I may provide at one or more intervals around the wheel, one or more brace lugs 18$^a$, 19$^a$ which are similar to the brace lugs 18, 19 but are disposed differently. The lugs 18$^a$ on the inner rim are disposed on the sides of the cushioning members to the front of the direction in which the wheel rim moves while the lugs 19$^a$ are disposed to the rear of such direction.

The rim or tire may be provided with a tread portion of any suitable form and construction. As illustrated in Figs. 1, 2 and 3 of the drawings, I preferably employ a tread band or ring 20 of rubber or any other suitable cushioning material and retain it in position by means of retaining flanges 21 formed by properly shaping the outer edges of the side plates 8. It will be noted that by constructing the latter as illustrated they serve not only as guides for the outer rim section but also as retaining means for the cushioning members 7 and the tread 20. Any suitable means may be provided for preventing the tread 20 from slipping circumferentially, but I preferably form upon the outer face of the outer rim section 6 transverse ribs 22 adapted to enter similar shaped recesses or seats in the inner faces of the tread.

In Fig. 7 of the drawings I have illustrated another form of tread which may be substituted for the one shown in Figs. 2 and 3. This tread comprises a shoe of wood or the like 23 having its outer and side faces covered with felt or other suitable cushioning material 24 which also extends into an annular channel or recess formed in the shoe 23. The cushion 24 is retained upon the shoe 23 by a covering of woven wire fabric or the like 25. The side edges of the covering 25 and the cushion 24 are clamped between the flanges 21 of the side plates to retain the tread in position upon the tire or rim.

In Figs. 8 and 9 of the drawings I have illustrated a modified form of my invention which consists of an inner rim section 5$^a$, an outer rim section 6$^a$ and interposed cushioning members 7$^a$. The latter are in the form of flat pieces of rubber or the like disposed transversely and having their inner and outer edges set in transverse grooves 12$^a$, 14$^a$ formed, respectively, in the inner and outer rim sections 5$^a$, 6$^a$. In all other respects than the ones above noted the construction of this modified form of the invention may be the same as that of the embodiment described.

The inner and outer rim sections and side plates of the tire or wheel are preferably constructed of aluminum or other light metal and they may be cast or otherwise formed.

From the foregoing it will be observed that my invention provides an exceedingly simple and practical resilient or cushioned wheel which will be exceedingly strong and durable and sufficiently elastic to relieve the vehicle body which it supports from the shock and jar incident to travel over rough roads or streets. The peculiar construction of the several parts of the invention enable it to be quickly and easily taken apart for repairs or the like.

While I have shown and described in detail the preferred embodiments of my invention it will be understood that I do not wish to be limited to the precise construction set forth and that various changes in the form, proportion and minor details may be resorted to without departing from the spirit or sacrificing any of the advantages of the invention.

Having thus described my invention what I claim is:

1. The combination of inner and outer rim sections provided with opposing seats, cushioning members arranged radially between the rim sections and having their ends engaged with said seats, and brace lugs upon the rim sections and engaged with one side only of the cushioning members, the brace lugs which engage each cushioning member being disposed upon opposite sides of the same and projecting beyond the outer edge of said seat.

2. The combination of inner and outer rim sections provided with opposing seats, cushioning members arranged radially between the rim sections and having their ends engaged with said seats, brace lugs arranged upon the rim sections and engaged with the cushioning members, the lugs for each cushioning member being disposed upon opposite sides of the same, the majority of the lugs upon one rim section being disposed upon the same side of the cushioning members and the remainder of said lugs upon the last mentioned rim section being disposed upon the opposite side of said cushioning members.

3. The combination of an inner rim section formed with sockets, an outer rim section, side plates secured upon the opposite sides of the outer rim section and slidably engaged with the inner rim section, the opposing faces of the outer rim section and the side plates being formed with registering recesses to provide sockets, and cushioning members arranged between the rim sections and having their ends seated in said sockets.

4. The combination of an inner rim section formed with sockets, an outer rim section, side plates secured upon the opposite sides of the outer rim section and slidably engaged with the inner section, the opposing faces of the outer rim section and the side plates being formed with registering recesses to provide sockets, cushioning members arranged between the rim sections and having their ends seated in said sockets, and brace lugs upon the rim sections and the side plates and engaged with the cushioning members, the brace lugs engaging each cushioning member being disposed upon opposite sides of the same.

In testimony whereof I hereunto affix my signature in the presence of two witnesses.

HENRY E. KEYES.

Witnesses:
  JOSEPH MORT,
  HARRY DODGE.